United States Patent [19]

Raidel

[11] Patent Number: 4,881,747
[45] Date of Patent: Nov. 21, 1989

[54] SELF STEERING SUSPENSION ASSEMBLY

[76] Inventor: John E. Raidel, Rte. 9, Box 400-M, Springfield, Mo. 65804

[21] Appl. No.: 179,762

[22] Filed: Apr. 11, 1988

[51] Int. Cl.$^4$ .............................................. B62D 61/12
[52] U.S. Cl. ................................. 280/81.6; 280/661; 280/704
[58] Field of Search ............... 280/704, 661, 675, 673, 280/81.6

[56] References Cited

U.S. PATENT DOCUMENTS

| | | | |
|---|---|---|---|
| 3,704,896 | 12/1972 | Buelow | 280/704 |
| 4,763,923 | 8/1988 | Raidel | 280/704 |
| 4,770,430 | 9/1988 | Lange | 280/81 A |

FOREIGN PATENT DOCUMENTS

| | | | |
|---|---|---|---|
| 254414 | 7/1926 | United Kingdom | 280/661 |
| 598024 | 2/1948 | United Kingdom | 280/661 |

Primary Examiner—Kenneth R. Rice
Attorney, Agent, or Firm—Rogers, Howell & Haferkamp

[57] ABSTRACT

A suspension system incorporating upper and lower torque rods pivotally connected between a hanger and an axle seat. The upper torque rod is preferably a hydraulic cylinder and piston assembly, the length of which is adjustable between extended and retracted conditions. In the extended condition, the upper torque rod pivots the axle to a forward pitch at which it is self-steering when the vehicle is driven forward. In the retracted condition, the upper torque rod pivots the axle to a negative pitch condition in which it is self-steering when the vehicle is operated in reverse. The hydraulic cylinder and piston assembly can be operated by the driver such as when the gears are shifted between forward and reverse. A lift spring is mounted between a plate on the hanger and a plate on the lower torque rod. The lift spring is positioned within a pocket defined on the hanger. The hanger is integral with a longitudinal plate and an upper spring mounting plate, and a shock absorber bracket is integral with the longitudinal plate.

20 Claims, 3 Drawing Sheets

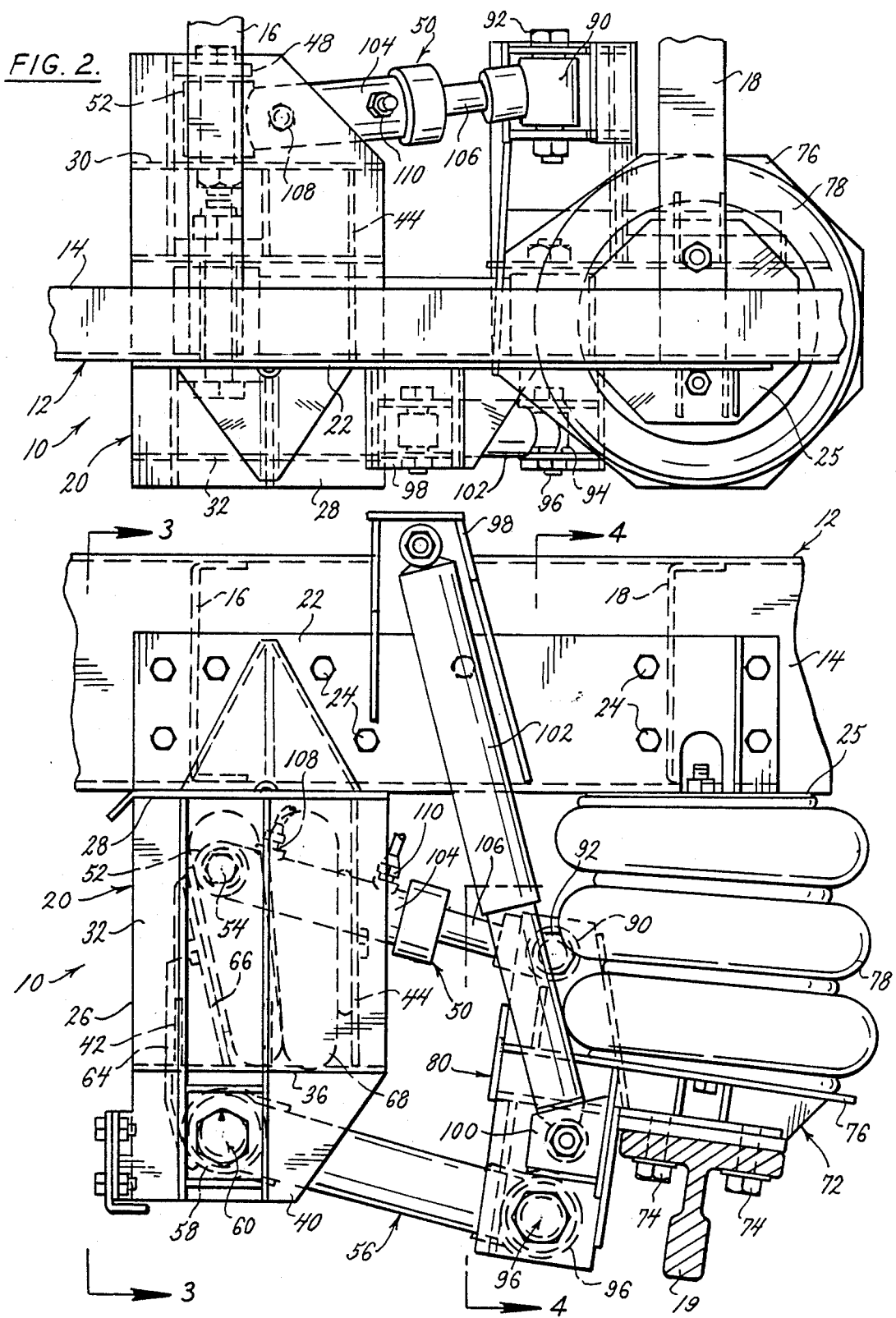

SELF STEERING SUSPENSION ASSEMBLY

BACKGROUND OF THE INVENTION

This invention relates to a suspension system that incorporates an automatic driver-controllable adjustment mechanism for setting the pitch of the axle. Pursuant to the invention, the pitch of the axle can be selectively set for self steering in either a forward or reverse direction.

In suspension systems for trailing axles and pusher axles, it is known that if the axle is installed with the proper pitch, the drag of the wheels will cause the axle to steer automatically in response to steering of the vehicle. It is also known in the art to provide a parallelogram arrangement of torque rods connected between a hanger and an axle seat to maintain a substantially constant pitch of the axle.

U.S. Pat. No. 4,132,432 to Raidel discloses an example of a suspension system wherein torque rods are connected between a hanger and an axle seat and are arranged in a parallelogram for maintaining a constant pitch of the axle. A lift spring is mounted between a plate on the hanger and a plate is connected to the lower torque rod. In the suspension system of this patent, as is typical, the axle pitch is constant and cannot be adjusted.

U.S. Pat. No. 4,132,432 also discloses an integral hanger and spring mount connected to an elongated longitudinal plate. The present suspension system is extremely compact and the hanger incorporates a cavity to accommodate the lift spring.

BRIEF SUMMARY OF THE INVENTION

This suspension system incorporates two torque rods pivotally connected between a hanger and an axle seat with the hanger depending from the vehicle chassis and the axle seat being connected to the axle. One of the torque rods, preferably the upper one, consists of a fluid cylinder and piston, preferably hydraulic. There are separate fluid ports to the cylinder, and the piston is extendable or retractable relative to the cylinder depending upon the direction of flow of hydraulic fluid through the ports.

In the extended condition, the hydraulic cylinder and piston have an overall length equal to the length of the lower torque rod. In the retracted condition, the hydraulic cylinder and piston is shortened. Alternative extension or retraction of the hydraulic cylinder and piston causes the axle seat to swing about its pivotal connection to the lower torque rod and this swings the axle, changing its pitch from a forward pitch of 4 to 6 degrees relative to a vertical plane to a rearward pitch of 4 to 6 degrees relative to the vertical plane.

The forward pitch of the axle is set to be optimum for self steering of the axle when the vehicle is moving in a forward direction. This constitutes approximately a 5° angle and is established by the extended condition of the cylinder and piston assembly. In this condition, the upper and lower torque rods are of equal length and their connections represent a parallelogram thereby maintaining constant the forward pitch of the axle.

When the vehicle is shifted to reverse, an electric circuit to a solenoid that controls a four-way hydraulic valve is closed, just as the electric circuit to the backup lights is closed when a vehicle is shifted to reverse.

The solenoid switches the four-way valve to reverse the flow of hydraulic fluid through the cylinder ports, causing the piston to retract to a predetermined position setting a predetermined shortened length of the cylinder and piston assembly. This causes the axle seat to swing about its connection to the lower torque rod, and the axle swings to a rearward pitch. This rearward pitch is set to about 5½°. Now, when the vehicle is operated in reverse, the axle will self steer because its pitch has been reversed.

When the gear shift is again moved to a forward gear, the electric circuit to the solenoid is opened, thereby returning the valve to its first condition, again returning the flow of hydraulic fluid to the first directions through the cylinder ports. This again extends the cylinder and piston assembly to substantially the same length as that of the lower torque rod. This swings the axle seat and axle, returning the axle to the approximately 5° forward pitch appropriate for self steering when the vehicle is driven forward.

The hanger assembly comprises an integral unit including a longitudinally extending plate to which the hanger is integrally joined. At the rearward portion of the plate, there is an integral spring mount plate connecting to the upper side of an air spring. An upper shock absorber mounting bracket is integral with the longitudinal plate. The hanger is especially formed to define a cavity within which a lift spring is mounted. The hanger assembly is extremely compact.

There is a transverse substantially vertical plate on the hanger to which one side of the lift spring is mounted. Another plate is movable with the lower torque rod and that plate is connected to an opposite side of the lift spring. When the lift spring is inflated, it causes the lower torque rod to swing upwardly about its connection to the hanger and lift the axle at times when the vehicle is not loaded.

DESCRIPTION OF THE DRAWINGS

FIG. 1 is a side elevation view of the suspension system;

FIG. 2 is a top plan view of the suspension system;

DETAILED DESCRIPTION OF PREFERRED EMBODIMENT

Figure 3:
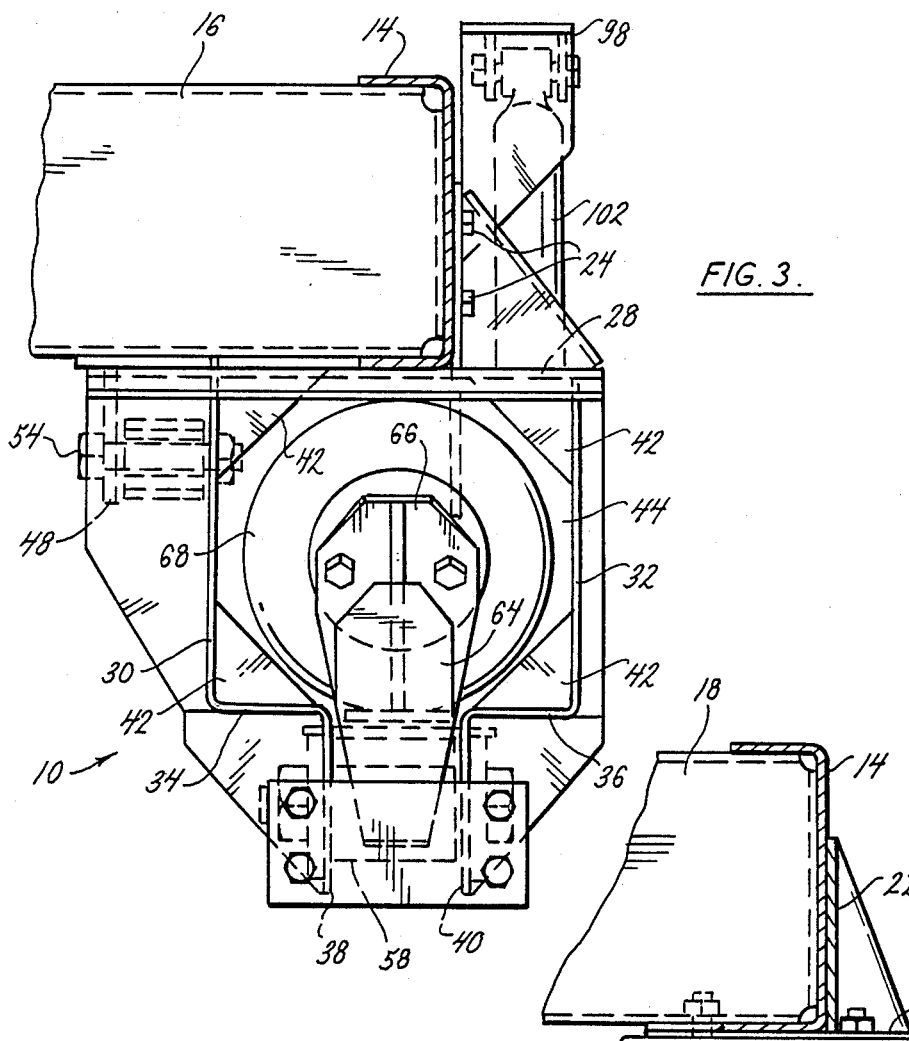
FIG. 3 is a view in section taken along the plane of the line 3—3 of FIG. 1.

This suspension system 10 is for installation on a vehicle having a chassis 12 including a longitudinal frame member 14 and transverse beams 16 and 18 that are connected between the side rail 14 and a like side rail on the opposite side of the chassis. The vehicle has an axle 19.

The suspension system 10 incorporates a hanger assembly 20 formed of a longitudinal plate 22 that is fastened by a plurality of bolts 24 to the side rail 14. An upper spring mounting plate 25 is welded to the longitudinal plate 22 adjacent its rearward end and a hanger 26 is welded adjacent the forward end of the longitudinal plate 22. The hanger 26 includes a horizontal plate 28 just below the longitudinal plate 22. Transversely spaced vertical plates 30 and 32 are welded to and extend downwardly from the horizontal plate 28. The vertical plates 30 and 32 lead to inwardly extending plate sections 34 and 36, respectively, and these lead to lower more closely spaced vertical sections 38 and 40, respectively.

There are reinforcing gussets 42 in the corners of the thus defined square (as viewed in FIG. 3). A transverse plate 44 is welded between the vertical plates 30 and 32, and between the horizontal plate 28 and the lower horizontal sections 34 and 36.

Spaced inboard of the vertical plate 30, there is a short vertical plate 48. An upper torque rod assembly 50 has a forward end 52 mounted on a bushing assembly 54 that is connected between the vertical plate 48 and the vertical plate 30. A lower torque rod 56 has a forward end 58 mounted on an eccentric bolt and bushing assembly 60.

An extender plate 64 is welded to the forward end 58 of the torque rod 56. A lift spring mounting plate 66 is welded to the extender plate 64. An air lift spring 68 is connected between the vertical plate 44 and the plate 66. When the air lift spring 68 is inflated, it revolves the connector plate 64 in a counterclockwise direction about the eccentric bolt and bushing assembly 60, lifting the torque rod 56.

An axle seat assembly 72 is connected by bolts 74 to the axle 19. The axle seat assembly 72 supports a lower spring mounting plate 76. An air spring 78 is connected between the upper spring mounting plate 25 and the spring mounting plate 76.

Figure 4:
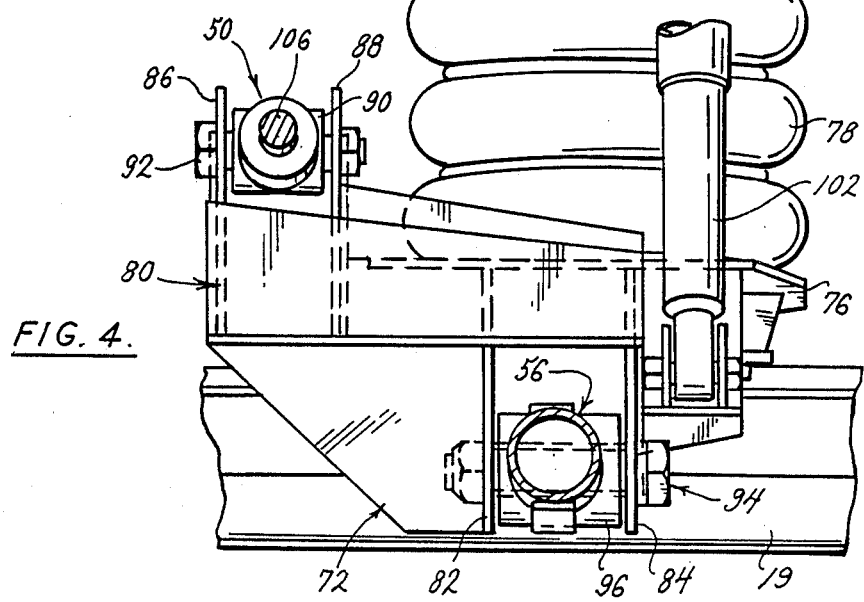
FIG. 4 is a view in section taken along the plane of the line 4—4 of FIG. 1.

Forward of the axle 19, the axle seat 72 has welded to it a bracket assembly 80 that has spaced lower vertical plates 82 and 84 located directly below the side rail 14, and spaced upper vertical plates 86 and 88 that are inboard of the plates 82 and 84, as shown in FIG. 4. The upper torque rod assembly 50 has a rearward end 90 journalled on a bushing assembly 92 that is mounted between the plates 86 and 88. The lower torque rod 56 has a rearward end 94 that is mounted on a bushing assembly 96 connected between the plates 82 and 84.

A shock absorber mounting bracket 98 is integral with the longitudinal plate 22, a lower shock absorber mounting bracket 100 is integral with the bracket assembly 80. A shock absorber 102 is mounted between the upper bracket 98 and the lower bracket 100.

Figure 6:
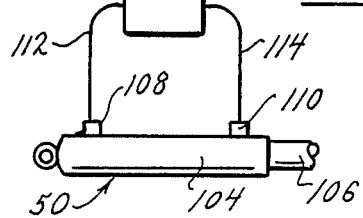
FIG. 6 is a schematic diagram of a control for the hydraulic piston and cylinder assembly.

The upper torque rod assembly 50 comprises a fluid cylinder 104 and piston 106, preferably hydraulic. There are spaced hydraulic fluid ports 108 and 110 to the cylinder 104. In a preferred installation, the hydraulic fluid ports 108 and 110 are connected by suitable tubes 112 and 114 to a solenoid operated four-way valve 116. The circuit 118 to the valve 116 includes a switch 120 that is open when the vehicle gear shift lever 122 is in any but a reverse gear position, and that is closed when the gear shift lever 122 moves to a reverse drive condition, as illustrated by the dotted line in FIG. 6.

When the hydraulic piston and cylinder assembly 50 is in its extended condition, as illustrated in FIG. 1, it and the lower torque rod 56 form substantially a perfect parallelogram to maintain the pitch of the axle 19 constant as the axle moves relative to the vehicle chassis 12. In this extended condition of the hydraulic cylinder and piston assembly 50, the axle 19 is at approximately a 5° forward pitch and the vehicle will self-steer when driven in a forward direction (to the left as viewed in FIG. 1).

Figure 5:
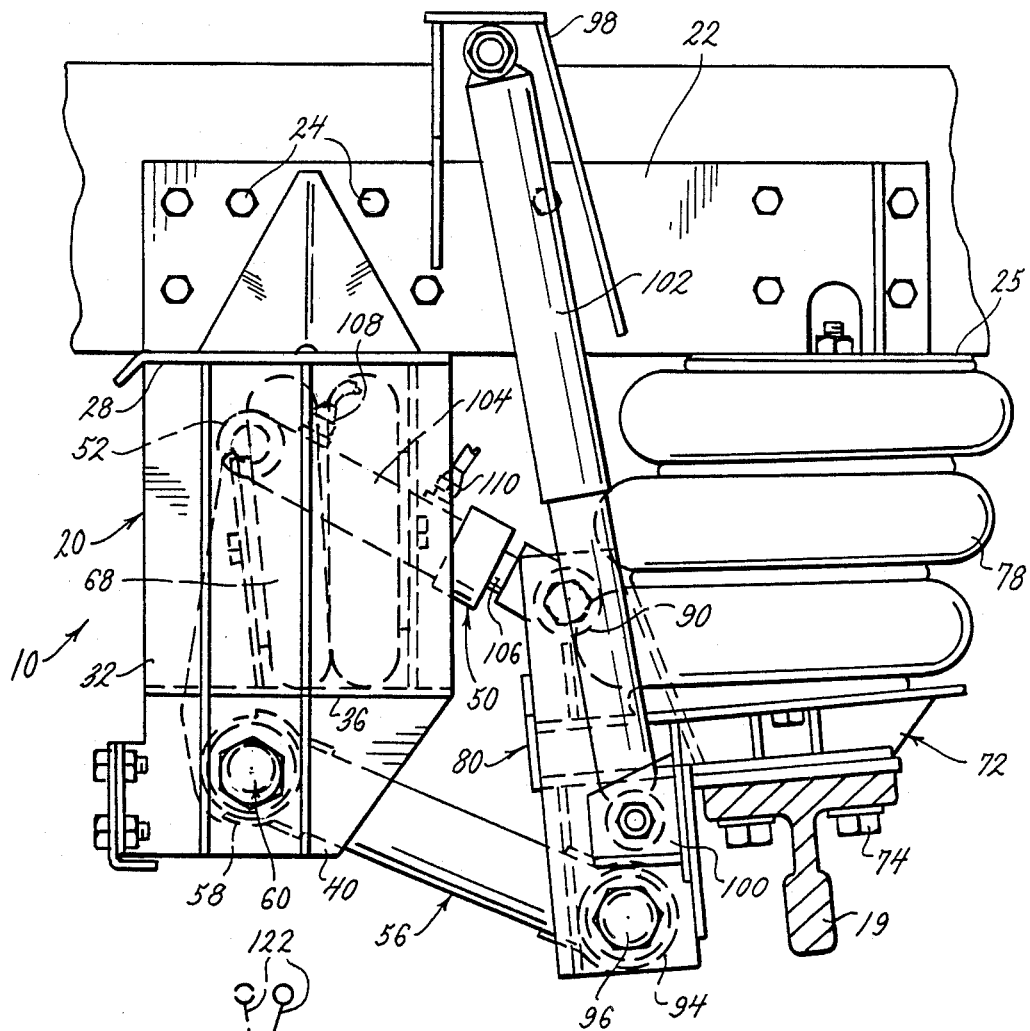
FIG. 5 is a side elevation view similar to that of FIG. 1 but showing the hydraulic piston retracted and the axle tilted to a reverse pitch.

When the hydraulic cylinder and piston assembly 50 is in its retracted condition, as illustrated in FIG. 5, the axle 19 is pivoted to a reverse pitch of approximately 5½°. In this condition, the axle will self-steer when the vehicle is driven in reverse (to the right as viewed in FIG. 5).

OPERATION

When the gear shift lever 122 is in any forward gear position, the switch 120 will be open and the four-way solenoid valve 116 will control flow of fluid to the ports 108 and 110 such that the hydraulic cylinder and piston assembly 50 will be in the extended condition illustrated in FIG. 1. This sets the pitch of the axle 19 for self-steering when the vehicle is driven in a forward direction. When the gear shift lever 122 is shifted to a position as illustrated in the dotted lines of FIG. 6, putting the vehicle in reverse, the switch 120 is closed, reversing the flow of hydraulic fluid to the ports 108 and 110. This retracts the hydraulic cylinder and piston assembly 50 to the condition illustrated in FIG. 6.

As a result, the axle seat assembly 72 pivots about the bushing mount 96 from the condition illustrated in FIG. 1 to the condition illustrated in FIG. 5, pivoting the axle 19 from the forward pitch illustrated in FIG. 1 to the reverse pitch illustrated in FIG. 5. In this reverse pitch, the axle will self-steer when the vehicle is operated in a reverse direction.

When the vehicle is not loaded, the lift spring 68 is pressurized to pivot the lower torque rod 56 in a counterclockwise direction. This will cause the axle seat assembly 72 and the axle 19 to be raised.

There are various changes and modifications which may be made to the invention as would be apparent to those skilled in the art. However, these changes or modifications are included in the teaching of the disclosure, and it is intended that the invention be limited only by the scope of the claims appended hereto.

I claim:

1. A consolidated, self-steering suspension system for a vehicle having a transmission, a chassis with side rails, and an axle, the system comprising:
  a hanger means;
  an axle seat adapted to support a vehicle axle;
  an upper torque rod pivotally connected to the hanger means and the axle seat;
  a lower torque rod pivotally connected to the hanger means and the axle seat;
  wherein one of the torque rods is a piston and cylinder assembly arranged to selectively vary the length of the said one torque rod with one of the piston and cylinder of the assembly pivotally connected directly to the hanger means and the other of the piston and cylinder of the assembly pivotally connected directly to the axle seat.

2. The suspension system of claim 1 comprising:
  control means for selectively varying the length of the piston and cylinder torque rod to change the pitch of the axle supported by the axle seat.

3. The suspension system of claim 11 wherein:
  the hanger means, the axle seat, the upper torque rod and the lower torque rod are arranged to form a parallelogram suspension system.

4. The suspension system of claim 1 wherein:
  said one of the torque rods is the upper torque rods.

5. The suspension system of claim 2 wherein:
  said one of the torque rods is arranged to be varied between an extended length that sets the axle with a forward pitch relative to a vertical plane, and a shortened length that sets the axle with a rearward pitch relative to a vertical plane.

6. The suspension system of claim 2 wherein:
the control means is arranged to vary the lengths of the piston and cylinder torque rod in response to a shifting of the vehicle transmission between forward and reverse speed ratios.

7. A compact, self-steering suspension assembly for a vehicle having a chassis and an axle comprising:
a hanger means supported by the vehicle chassis;
an axle seat supporting a vehicle axle and spaced longitudinally from the hanger means;
an upper torque rod having first and second ends, with the first end pivotally connected to the hanger means and the second end pivotally connected to the axle seat;
a lower torque rod having first and second ends, with the first end pivotally connected to the hanger means and the second end pivotally connected to the axle seat; and
control means for selectively varying the length of one of the torque rods to change the pitch of the axle supported by the axle seat.

8. The suspension system of claim 7 comprising:
a first spring means mounted between the axle seat and the vehicle chassis; and
a second spring means mounted between the hanger means and a torque rod, the second spring means being adapted to pivot said torque rod about the hanger means and raise the axle seat.

9. The suspension system of claim 8 wherein:
the hanger means comprises a transverse end wall and longitudinal inboard and outboard side walls secured to opposite ends of the end wall, the walls defining a box that completely encloses the second spring means.

10. The suspension system of claim 7 wherein:
the upper torque rod is arranged inboard relative to the lower torque rod.

11. The suspension system of claim 7 comprising:
an eccentric bolt and bushing assembly pivotally connecting one of the torque rods to the hanger means.

12. A consolidated suspension assembly for a vehicle having a chassis with side rails, a transmission, and an axle, the assembly comprising:
an elongated plate having forward and rearward areas and being adapted to be secured to a side rail of a vehicle chassis;
a hanger means formed integrally with and extending downward from the forward area of the elongated plate, the hanger means having a transverse end wall and longitudinal inboard and outboard side walls secured to opposite ends of the end wall;
a spring mounting bracket formed integrally with the rearward area of the elongated plate;
an axle seat means arranged to support a vehicle axle;
a first torque rod having first and second ends, the first end pivotally connected to the inboard side wall of the hanger means and the second end pivotally connected to the axle seat means;
a second torque rod outboard of the first torque rod and having first and second ends with the first end pivotally connected to the hanger means and the second end pivotally connected to the axle seat;
a spring means having first and second ends with the first end of the spring means being connected to the end wall of the hanger means; and
extender plate means connected to the first end of the second torque rod and the second end of the spring means.

13. The suspension assembly of claim 12 comprising:
an upper shock absorber bracket formed integrally with the elongated plate intermediate the forward and rearward areas of the plate for pivotally supporting a first end of a shock absorber; and
a lower shock absorber bracket formed integrally with the axle seat means for pivotally supporting a second end of the shock absorber.

14. The suspension assembly of claim 12 comprising:
a control means for selectively varying the pitch of the axle supported by the axle seat means.

15. The suspension assembly of claim 14 wherein:
the control means comprises a means for adjusting the length of one of the torque rods.

16. The suspension assembly of claim 15 wherein:
said one of the torque rods is a piston and cylinder assembly.

17. The suspension assembly of claim 15 wherein:
said one of the torque rods is the first torque rod.

18. The suspension assembly of claim 12 wherein:
the transverse end wall and the longitudinal inboard and outboard side walls of the hanger means are arranged to form a box that completely encloses the spring means.

19. The suspension assembly of claim 14 comprising:
the control means being adapted to vary the pitch of the vehicle axle from 4 degrees to 6 degrees in a forward direction relative to a vertical plane, and from 4 degrees to 6 degrees in a rearward direction relative to a vertical plane.

20. The suspension assembly of claim 12 comprising:
a connecting beam extending between the hanger means and a like hanger means to be supported from opposite side rails of a vehicle chassis, the connecting beam being connected to the hanger means adjacent a lower section thereof.

* * * * *